March 31, 1931.  A. E. HENDERSON  1,798,325
AEROPLANE AND CONTROLLING MEANS THEREFOR
Original Filed Jan. 21, 1918   2 Sheets-Sheet 2
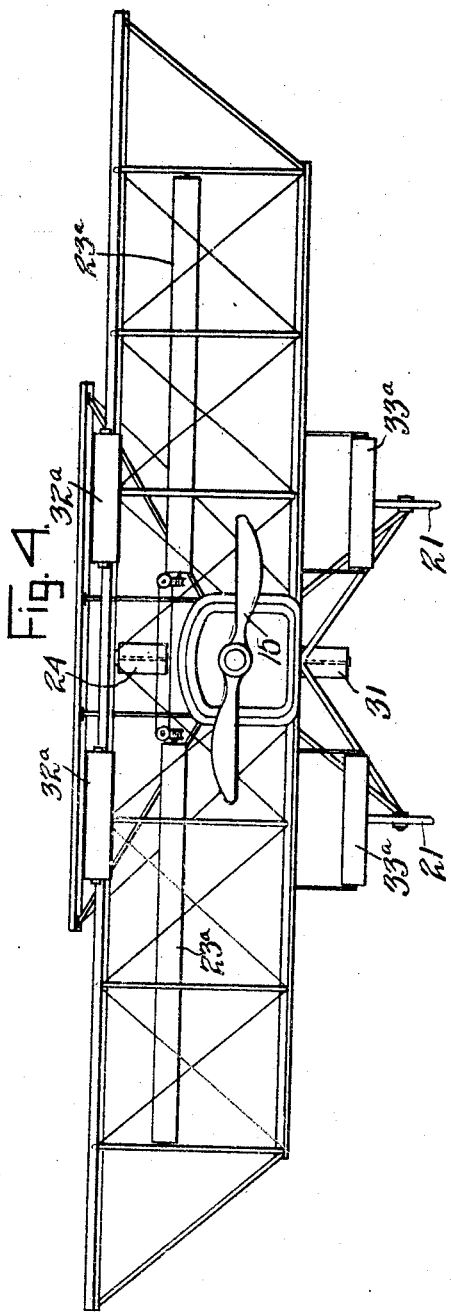
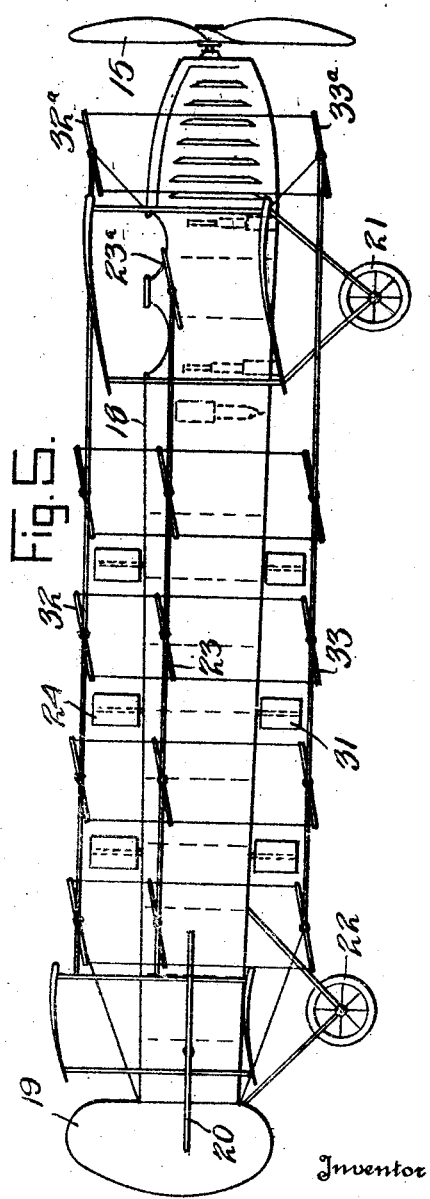
Inventor
Albert E. Henderson Patented Mar. 31, 1931

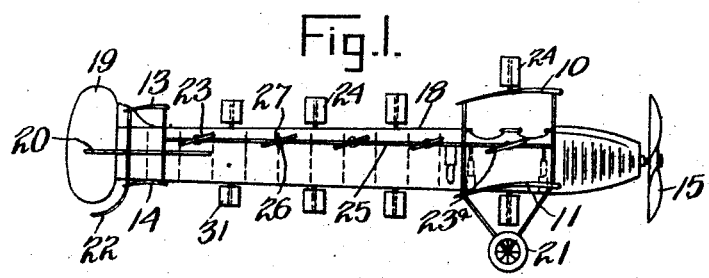
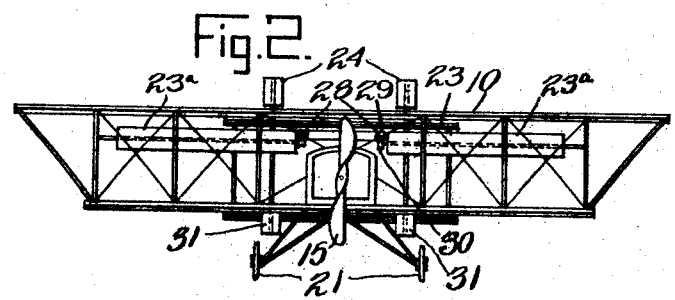
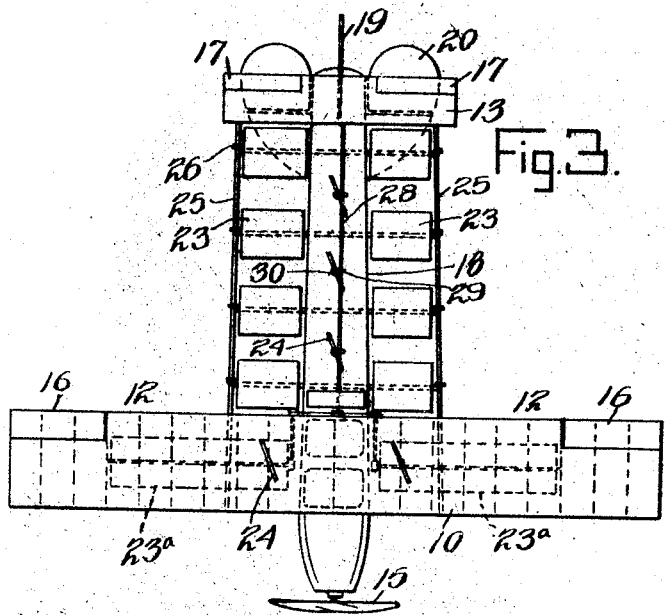

1,798,325

UNITED STATES PATENT OFFICE

ALBERT ENNIS HENDERSON, OF TORONTO, ONTARIO, CANADA

AEROPLANE AND CONTROLLING MEANS THEREFOR

Refile for abandoned application Serial No. 212,999, filed January 21, 1918. This application filed April 16, 1927, Serial No. 184,372. Renewed April 7, 1930.

The object of the invention is to provide an aeroplane having a structure and means for control,—permanent, automatic, and variable by the pilot, whereby maximum and minimum speeds of flight and climbing ability, covering a wide range of intermediate stages and possibilities, may be attained without detracting from the stability,—longitudinal, lateral, or directional, and without decreasing the efficiency of the propeller as by deflecting the center of thrust or the longitudinal axis of the machine from a truly horizontal position.

A further object of the invention is to provide for a high aspect ratio and the maximum lift-drift ratio of the main or stationary plane or "surface" structure so as to provide for maximum speed or velocity of flight, when that is the desideratum, while permitting, under pilot control, the relatively abrupt "stalling" of the machine to check its speed without affecting its stability, in either of the phases indicated, and without modifying its horizontality or changing its lift-drift ratio so far as the main sustaining and directional elements are concerned, while affording an effective keel-surface in rear of the vertical or turning axis of the machine with a minimized increase of skin friction when the parts are disposed for rapid flight.

To provide for an increase of lateral and longitudinal stability when the pilot-controlled sustaining elements are adjusted for slow flight or temporary poising, without in any way detracting from the normal and permanent sustaining properties of the main planes or surfaces, and hence without altering the general or essential characteristics of the machine as an entirety or involving any problems in the matter of control for solution by the pilot, due to the optional adjustment or variation in position of the auxiliary means including said pilot-controlled sustaining elements.

To provide for the construction of a machine of the heavier-than-air type without restriction to the "compromise" plan or theory which recognizes the opposing relations of velocity and climb or "lift", and seeks an average or an intermediate stage of efficiency between maximum velocity and maximum climb with a proportionate sacrifice of both, and to that end to provide permanent and relatively invariable sustaining means arranged to secure the maximum velocity of flight with a given thrust or power, and variable auxiliary sustaining means, under the control of the pilot, for securing the maximum or any desired degree of climb or lift without detracting from the efficiency or altering the relations of the first named means or varying the poise, longitudinal or lateral, of the machine.

To provide for accomplishing the foregoing objects regardless of the shifting of the center of gravity of the load of the machine, whether or not the alteration therein is effected gradually or abruptly.

To provide for trimming to prevent lateral drift of the craft due to side or quartering winds or air currents, to permit of direct flight to an objective point, without "beating" or "wearing" or heading into the wind with its consequent loss of speed and energy as well as time, and yet to secure this result while maintaining the machine upon an even keel.

Further objects and advantages will appear hereinafter in the course of a detailed description of a substantial embodiment of the principles involved, it being understood that changes in form and proportions may be resorted to in adapting the mechanism to varying conditions and purposes of use without departing from the spirit of the invention.

In the drawings:

Figure 1 is a side view of a craft having the approved sustaining, propelling, elevating and guiding means and including the supplemental or auxiliary devices representing the invention arranged in cooperative relation therewith.

Figure 2 is a front view of the same.

Figure 3 is a plan view.

Figures 4 and 5 are respectively front and side views of a craft embodying a modification of the invention in which the same principles are involved.

The main sustaining plane structures are represented by the fixed or permanently positioned upper and lower fore-planes 10 and 11, extended to form the wings 12, and similarly positioned rear planes 13 and 14, set at the approved and most effective angles of incidence to secure the maximum lift-drift ratio and velocity for a given thrust provided by the propeller 15, which in turn may be of any approved type and applied in singular, as shown, or multiple, as preferred. The "surfaces", as the main sustaining planes may be designated, to distinguish from auxiliary planes hereinafter specifically described, may also constructed with the most effective camber and maximum leading edge, the fore and aft surfaces may be arranged at different angles of incidence (that of the aft planes being less than that of the fore planes), the upper and lower members may be arranged in "staggered" relation (the upper in advance of the lower) to maintain the maximum lift efficiency of the former, and said surfaces may be provided with ailerons 16 and 17, those of the aft surfaces being preferably connected for cooperative action and adjustment with those of the fore surfaces to avoid the torque which otherwise might be caused at the forward end of the fuselage structure. In this connection it should be noted that the fuselage structure may be of the single or well-known type arranged on suitable approved stream lines, or may be of multiple structure to provide for an intervening space or spaces, as will appear hereinafter.

The rudder 19 may, as above noted, be of any suitable or approved type and mounting, as also may the elevators 20, any desired form of fore and aft alighting devices 21 and 22 being added.

Disposed preferably above the center of resistance of the structure, taking into consideration all of the elements thereof, or above and approximately parallel with the axis of the fuselage, is a series of auxiliary dirigible sustaining planes 23, preferably arranged in two or more parallel groups, one of which is disposed on each side of the vertical plane of the axis of the fuselage and adapted for either simultaneous, independent, or proportional deflection from a flat or horizontal position to afford greater or less sustaining force or lift, or to be arranged at a greater or less incidence, angularly, so as to modify to a greater or less extent the vertical or lifting component of the dynamic resistance. Moreover as may be determined by experiment, or to meet the varying conditions of use or purpose, the extent of deflection, or movement from an arbitrarily assumed neutral position, may be varied as to the respective planes in the series or in each group of the series, as for example, the foremost, or the foremost and rearmost planes of the series or a group thereof may be movable simultaneously with the intermediate planes of the series or group but to a greater extent, and yet be adapted by a corresponding ratio in return movement to resume the neutral position in conformity with that of said intermediate planes, any suitable or approved mechanical means being employed to accomplish this movement. Also, as above indicated, these auxiliary sustaining planes are preferably arranged in parallel groups at either side of the vertical plane of the axis of the fuselage, so as to afford an additional lateral as well as longitudinal stabilizing means, and when this arrangement is adopted the intervening space may be utilized to provide for the positioning, in the vertical plane of the axis of the fuselage, and also above the horizontal plane thereof, of axially vertical trimming planes 24, which may also properly be termed "drifting" planes and are preferably coupled with actuating means whereby a simultaneous and proportionate adjustment thereof may be secured, either to cause deflection in one direction or the other from the vertical plane of the axis of the fuselage, to effect bodily lateral movement of the structure or to compensate for a side or quartering wind or current of air, or to cause accurate alinement with said axis of the machine as when velocity is desired, and it is consequently important to minimize the passive drift which is directly opposed to the thrust due to the action of the propelling mechanism. By means of the trimming or drifting planes it is possible to compensate for or neutralize the effect of side winds or drifts of air to adapt the craft to proceed in a direct line toward its objective, and thus avoid the disadvantages incident to heading the craft more or less into the wind, as in the ordinary practice, and thus pursuing a more or less circuitous or indirect route. These auxiliary directional means also serve to assist the pilot in effecting such bodily lateral movement of the entire structure as to facilitate positioning the craft over a moving or stationary object which may be below, such as another air-craft, a bridge or a moving train, or a water-craft whether of the surface or submarine type. By means of the auxiliary sustaining planes whereby the elevating or lifting component of resistance may be varied, it is possible to reduce the forward speed of the craft so as to time it more or less accurately with that of a moving objective such as above indicated.

In the construction illustrated in the drawings, the operation of the movable sustaining planes is effected through the agency of a longitudinal shaft or shafts 25, provided with worms 26 engaging worm gears 27 on the spindles or hubs of the blades, and correspondingly the trimming planes are movable to and held in adjusted positions through the agency of a shaft 28 having worms 29 engaging worm gears 30 on the spindles of said planes, but any equivalent mechanism may be adopted in this connection with the object in view of permitting movement to any desired degree and locking or holding the planes in the adjusted position against accidental displacement or movement due to air pressure or the vibration of the structure.

Moreover, as a means of emphasizing or fortifying the lateral or transverse stability of the machine, and to overcome any tendency of the same to roll or turn upon its longitudinal axis, the series of trimming planes may be duplicated by the arrangement of a further cooperative series 31, shown in Figures 1 and 2, and also as shown in Figure 2 duplicate series of these trimming planes may be arranged both above and below the horizontal plane of the axis of the machine. Obviously, all of the planes in the several series may be adjustable simultaneously and to the same degree in a common direction, or to a proportionate degree in the same direction, or the planes in the series respectively above and below the longitudinal axis of the machine may be adjusted independently either simultaneously or proportionately, as may be found desirable in practice, and by any means or under any such control as may be found desirable.

Also, it is equally obvious that any desired lateral extension of the auxiliary sustaining planes may be provided, and as shown in Figures 1 to 3 inclusive, the forward elements 23ª thereof may be disposed between planes of the upper and lower main sustaining surfaces and extending to a considerable degree beyond that of the remaining elements of the same series.

Moreover, as indicated in Figures 4 and 5 these auxiliary, dirigible sustaining planes may be multiplied in number as by arranging a series 32 above and 33 below the plane of the main series 23, and elements 32ª and 33ª thereof may be disposed in advance of the main or stationary sustaining planes or surfaces.

From the foregoing description it will be obvious, primarily, that the utilization of the auxiliary or supplemental means which have been suggested to effect certain purposes, accomplish certain objects, and overcome certain defects and insufficiencies of aircraft as heretofore constructed, the main and fundamentally approved sustaining means and devices and relations of elements designed for maintaining directional, longitudinal and lateral stability under normal and known conditions remain unaffected, so that the pilot may always rely upon such a relation of these known elements as to enable him to retain control of his machine, or regain it in an emergency. The operation and control of the auxiliary or supplemental means herein submitted are such as to cooperate with the fixed and approved means above noted without in any way detracting from their efficiency, and hence when the pilot has become accustomed to the peculiarities and characteristics of flight of his machine under normal conditions, and by the use of the usual and approved agencies including the main sustaining surfaces and his propelling mechanism, he encounters no embarrassment, and is involved in the solution of no problems in that respect due to the manipulation of the auxiliary devices adapted to effect movements which are foreign to, or in exaggeration of those of the standard or known type of construction. It is a well-known fact that there are peculiarities and characteristics of operation inherent in every machine, and these peculiarities and characteristics differ in machines of the same type and constructed along the same lines, and until they are known to the pilot by actual test and experience, they involve problems which call for the exercise of his skill in order that different conditions of flight may be met promptly and effectively. Obviously, any change in, or adjustment of, the positions of the main sustaining surfaces or other essential elements of a machine, promptly produces new conditions and involves new problems for solution by the pilot, whereas by providing for the permanency of these main or essential elements the difficulties of the pilot are minimized, and the flight of his machine under normal conditions, or when the auxiliary means are not employed, remains the same.

In other words, the main sustaining, propelling and controlling devices of the approved type of aircraft retain their proper relations and proportions under all conditions and may be relied upon at all times by the pilot in his manipulation of the same, so that the control or adjustment of the auxiliary means herein described is entirely supplemental thereto, and upon the restoration of the latter to their neutral positions, the first-named agencies are free to perform their normal and known functions relative to the structural body of the machine. The only modification of this fundamental principle which has been suggested herein resides in the provision of the supplemental ailerons with which the aft sustaining surfaces are provided and which may, and under normal conditions should, be cooperatively related with the ailerons of the fore sustaining surfaces, so that any torque, or tendency to torsional strain in the structure may be avoided, due either to the additional keel surface in rear of the vertical axis of the body of the machine, or the location of the center of gravity of the load carried by the machine and it is obvious that the means employed in this connection may be such as to effect either an equal or a proportional variation in the positions of the fore and aft ailerons on the same side of the machine as may be necessary or as may be found in practice to be essential to the proper correction or avoidance of the indicated tendency in respect to torque.

This application is for the same subject matter as my application No. 212,999, filed January 21, 1918, and allowed on February 24, 1925, and forfeited for non-payment of the final Government fee because of circumstances beyond my control at the time. The subject matter, however, has not been put into public use and I therefore file this application as a renewal and continuation of said original application and in the form and with the claims as allowed in said original application.

Having thus described the invention, what I claim and desire to secure by Letters Patent is:

1. An aeroplane having fore and aft main sustaining plane structures, including rigid upper and lower planes, lateral and vertical guiding means, and supplemental adjustable sustaining planes mounted on transverse axes between the fore and aft main plane structures to serve as auxiliary ascending means, certain of said supplemental planes being located between said upper and lower planes.

2. An aeroplane having rigid fore and aft main sustaining planes, lateral and vertical guiding means, and supplemental adjustable sustaining planes of relatively small size arranged on transverse axes between the fore and aft main plane structures and in series above and below the normal center of resistance.

3. An aeroplane having rigid fore and aft main sustaining planes, lateral and vertical guiding means, and supplemental adjustable sustaining planes of relatively small size mounted on transverse axes between the fore and aft main plane structures in series disposed longitudinally of the fuselage and in upper, lower and intermediate planes.

4. An aeroplane having fore and aft rigid main sustaining planes, lateral and vertical guiding means, and supplemental adjustable sustaining planes of relatively small size mounted on transverse axes between the fore and aft main plane structures in series disposed longitudinally of the fuselage in upper, lower and intermediate planes, the upper and lower series being disposed respectively above and below the normal axial center of resistance of the structure.

5. An aeroplane having main fore and aft sustaining planes, intermediate adjustable supplemental sustaining planes disposed on transverse axes and in a series longitudinally of the fuselage, and trimming or lateral drift planes disposed on vertical axes in a longitudinal series adjacent to the plane of the supplemental sustaining planes and movable in opposite directions.

In witness whereof, I have hereunto set my hand at Washington, District of Columbia, this fifth day of March, A. D. nineteen hundred and twenty-seven.

ALBERT ENNIS HENDERSON.